Jan. 2, 1940.  R. A. GOEPFRICH  2,185,434
BRAKE
Filed Jan. 15, 1937   4 Sheets-Sheet 1.
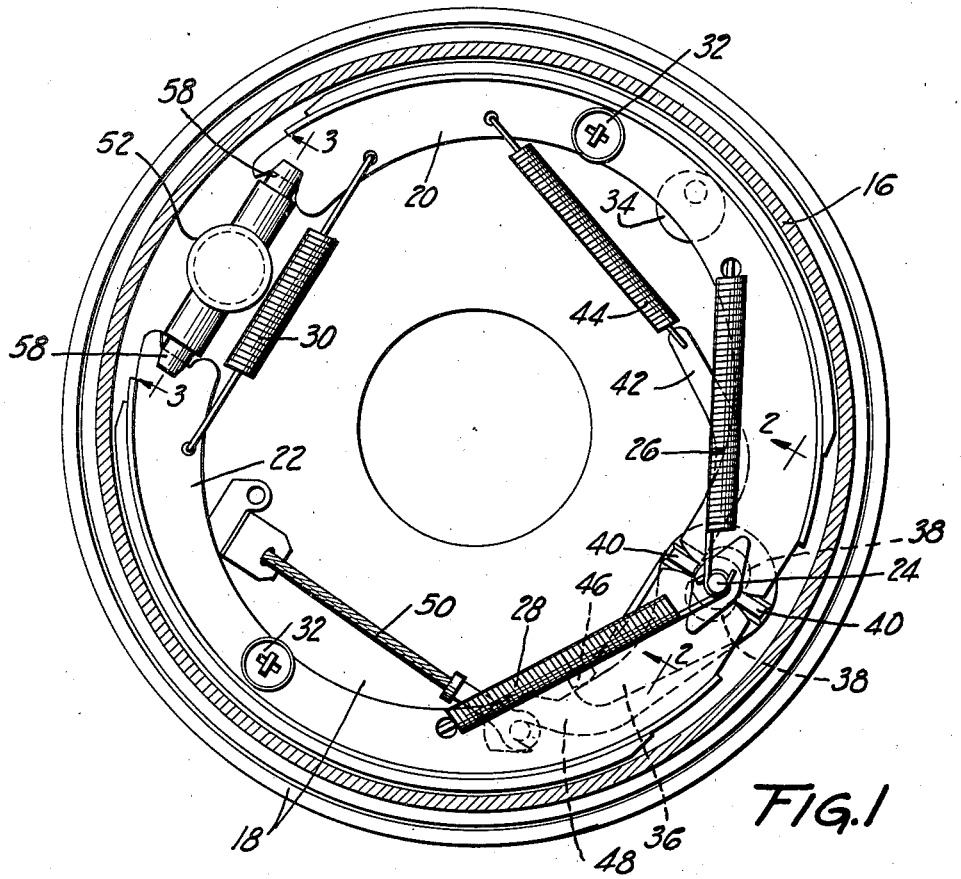
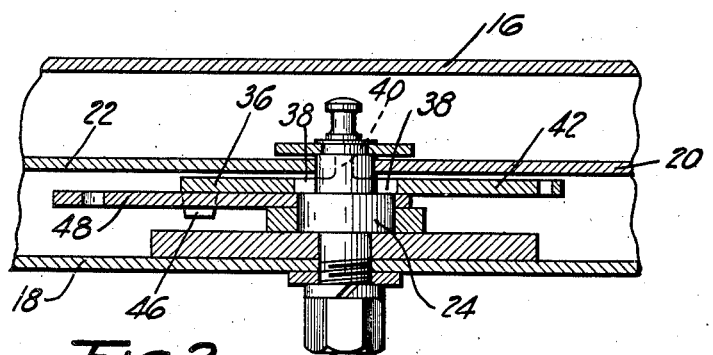
INVENTOR
RUDOLPH A. GOEPFRICH
BY
ATTORNEY

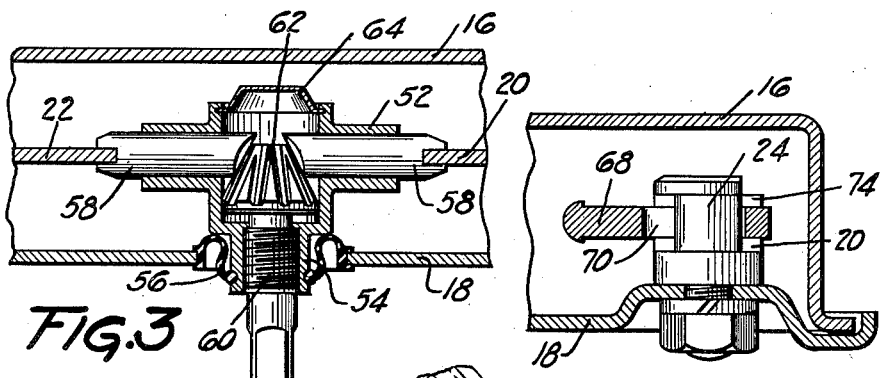

Jan. 2, 1940.  R. A. GOEPFRICH  2,185,434
BRAKE
Filed Jan. 15, 1937   4 Sheets-Sheet 3
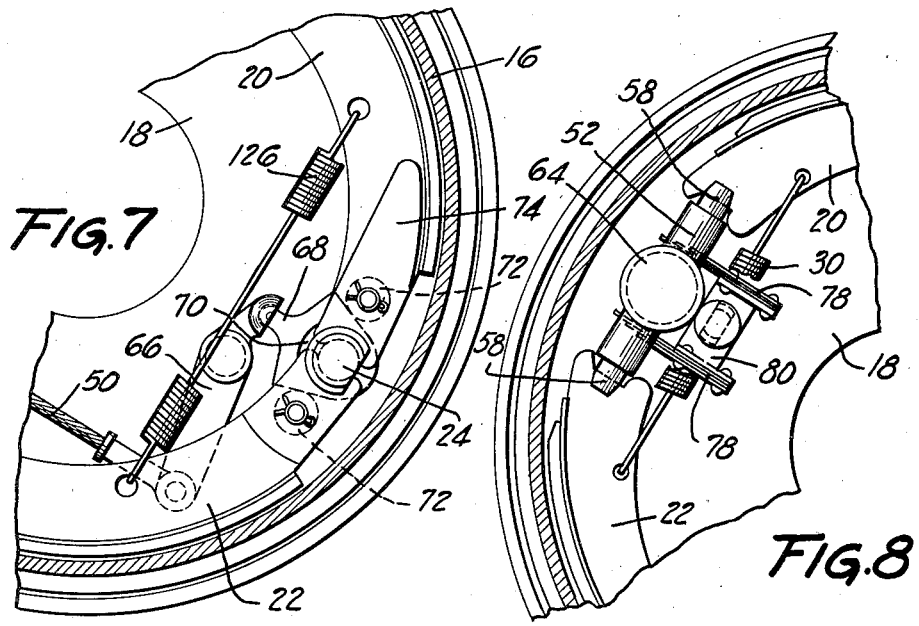
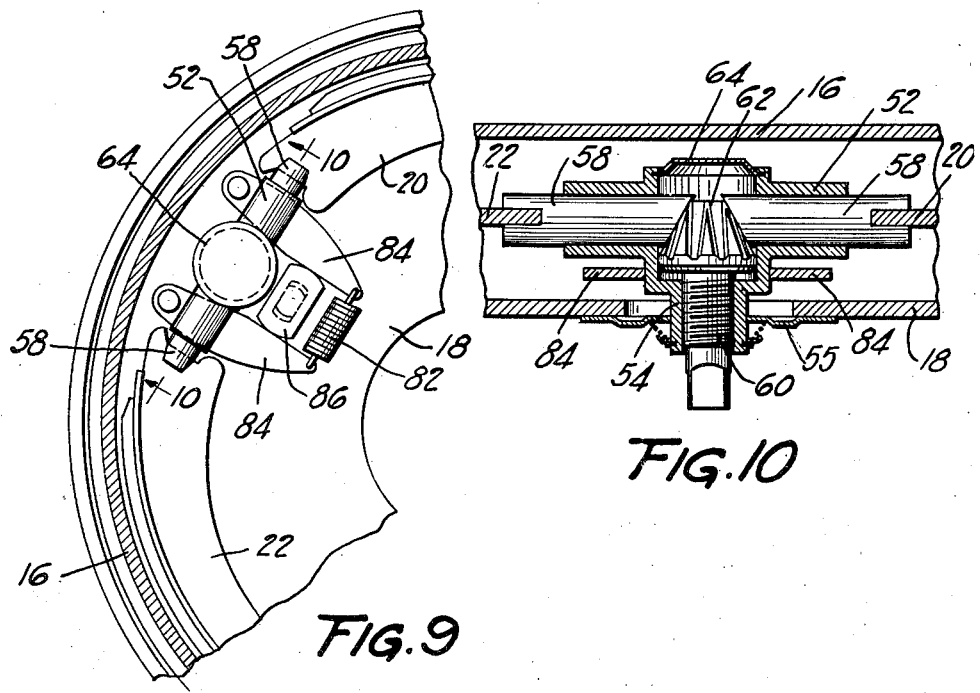
INVENTOR
RUDOLPH A. GOEPFRICH
BY
ATTORNEY

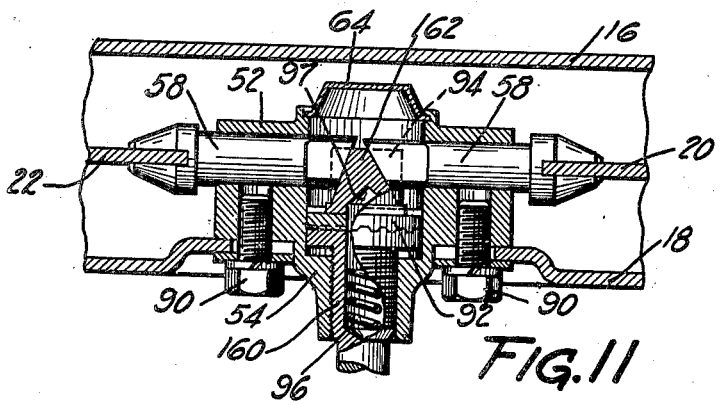
FIG.11
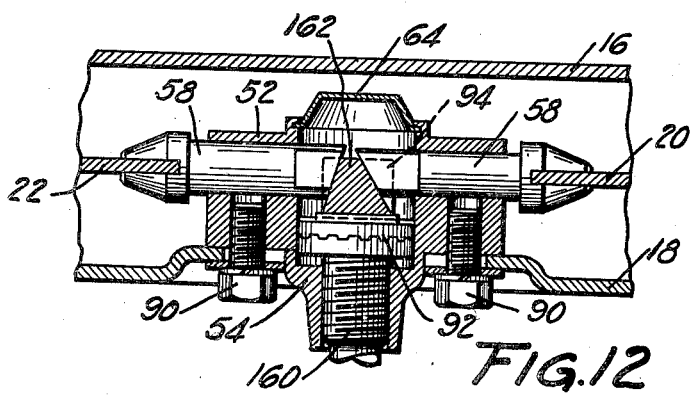
FIG.12
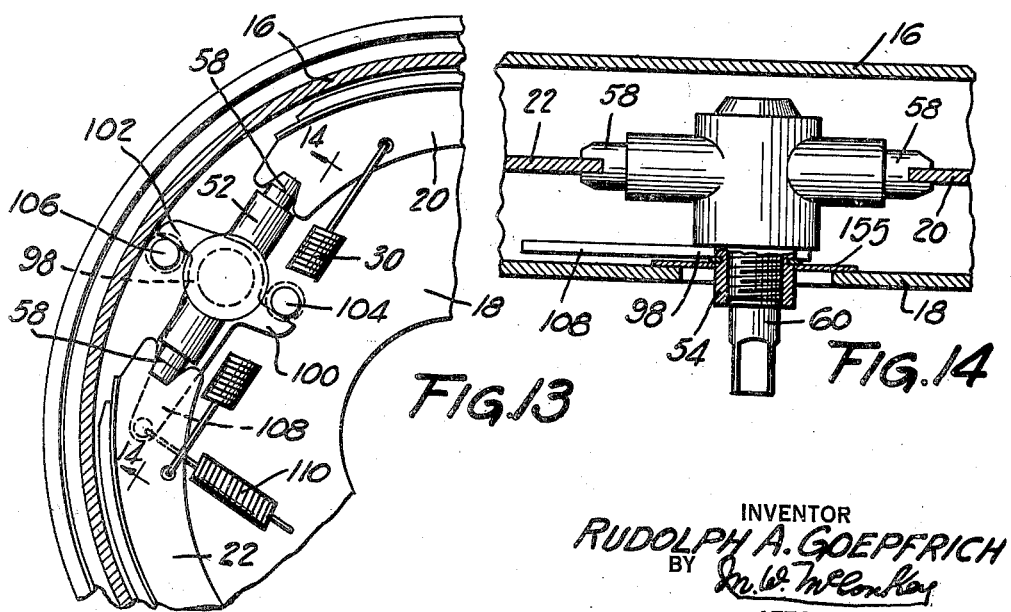
FIG.13
FIG.14
INVENTOR
RUDOLPH A. GOEPFRICH
BY
ATTORNEY Patented Jan. 2, 1940

2,185,434

UNITED STATES PATENT OFFICE 2,185,434

BRAKE

Rudolph A. Goepfrich, South Bend, Ind., assignor to Bendix Products Corporation, South Bend, Ind., a corporation of Indiana Application January 15, 1937, Serial No. 120,651

5 Claims. (Cl. 188—79.5)

This invention relates to brakes, and is illustrated as embodied in an internal expanding brake for an automobile. An object of the invention is to provide a simple and rugged adjustable floating connection for the shoes of such a brake.

In the arrangements illustrated, the shoes are connected by floating means including a bracket movably mounted on the brake backing plate between the ends of the shoes. The bracket carries a pair of plungers arranged end to end and engaging the shoes at their outer ends, and an adjuster arranged transversely of the plungers and operable from outside the backing plate to force the plungers apart to adjust for wear on the shoes.

Another feature of the invention relates to providing the above-described connection with yielding centering means.

The above and other objects and features of the invention, including various novel combinations and desirable particular arrangements, will be apparent from the following description of the illustrative embodiments shown in the accompanying drawings, in which:

Figure 1 is a vertical section through the brake, just inside the head of the brake drum, showing the shoes of the brake in side elevation;

Figure 2 is a partial section through the brake-applying means, on the line 2—2 of Figure 1;

Figure 3 is a partial section through the adjustable shoe-connecting means, on the line 3—3 of Figure 1;

Figure 4 is a partial section corresponding to part of Figure 1, but showing a different brake-applying means;

Figures 5 and 6 are partial sections through the brake-applying means of Figure 4, on the lines 5—5 and 6—6 of Figure 4 respectively;

Figure 7 is a partial section, corresponding to part of Figure 1, but showing a different brake-applying means;

Figures 8 and 9 are partial sections corresponding to part of Figure 1, but showing two different centering means acting on the connection between the shoes;

Figure 10 is a partial section on the line 10—10 of Figure 9;

Figures 11 and 12 are partial sections corresponding to Figure 3, but showing different adjusters for the shoe-connecting means;

Figure 13 is a partial section corresponding to Figures 8 and 9, but showing a different centering means; and Figure 14 is a partial section on the line 14—14 of Figure 13.

The brake illustrated in Figure 1 includes a rotatable drum 16, at the open side of which is a support such as a backing plate 18, and within which are arranged brake shoes 20 and 22 between the ends of which at one side of the brake is arranged an anchor or post 24 carried by the backing plate 18.

The brake is provided with return springs 26 and 28 tensioned between the anchor 24 and the respective shoes, whichever one of these springs is connected to the secondary shoe is stronger than the one connected to the primary shoe. There is also shown a spring 30 tensioned between the shoes, and holding them against the adjustable connection described below. Suitable steady rests 32 and adjustable shoe-positioning stops 34 may be provided.

The brake may be applied by means such as a floating lever 36, cut away at 38 to clear the anchor 24 and provided with thrust lugs 40 projecting between the ends of the shoe webs on opposite sides of the anchor. This lever is shown with an extension 42 connected to a lever-returning spring 44.

The lever 36 has a lateral lug 46 engaged by the edge of an operating lever 48, pivoted on the anchor 24 and actuated by the cable 50 of a Bowden type control. The levers 36 and 48 swing parallel to the backing plate in the space between the backing plate and the shoe 22.

The shoes 20 and 22, at the side of the brake opposite the anchor 24, are connected by an adjustable floating connection. This connection includes a bracket 52 having a boss 54 floating with the shoes in an opening in the backing plate (and preferably closed by a boot 56). This bracket is formed with aligned passages for plungers 58 slotted at their outer ends to embrace the ends of the webs of the shoes 20 and 22.

The boss 54 has threaded therethrough the stem 60 of a conical wedge 62 which engages the beveled adjacent inner ends of the plungers 58, and which is operated by turning the stem 60 to force the plungers 58 apart to adjust the brake for wear of the lining. The wedge 62 may be fluted for yieldingly interlocking with the plungers 58. The opening in the bracket 52 through which the wedge 62 is inserted may be closed by a stamping or the like 64.

In the brake of Figures 4-6, the cable 50 of the Bowden control is connected to a lever 66 fulcrumed on the backing plate and having at its end a socket receiving the ball end of a thrust wedge 68 having a pear-shaped opening 70 for the anchor 24, and engaging rollers 72 mounted between the shoe webs and plates 74 welded thereto. The arrangement in Figure 7 is the same as that in Figure 4, except that in Figure 7 there is a single return spring 126, while in Figure 4 there are two springs 26 and 28, differing in strength, connected to a post carried by the backing plate.

Figure 8 illustrates the boss 54 of the above-described bracket 52 embraced between leaf springs 78 secured to the opposite sides of a U-shaped bracket 80 adjustably bolted to the backing plate. The springs 78 serve to center the shoes when the brake is released.

In Figures 9 and 10, in place of the centering springs 78 there is a single coil spring 82 tensioned between levers 84 pivoted on the backing plate and embracing the boss 54 between them. A block 86, adjustably bolted to the backing plate between the levers 84, prevents movement of one or the other of the levers when the brake is applied, while at the same time the boss 54 swings the other lever 84 away from the block 86 to stretch the spring 82. A spring-held plate 55 serves as a cover for the opening in the backing plate through which the boss 54 passes.

In the arrangement of Figure 11, the bracket 52 is guided by bolts 90 passing through slots in the backing plate, and the threaded stem 160 has a head formed with radial teeth yieldingly interlocking with corresponding grooves in a washer 92 which has a transverse rib or key received in a corresponding groove or keyway in the base of a block 94 carrying an integral wedge 162 engaging the beveled ends of the plungers 58.

If desired, bolts 90 may be arranged to clamp the bracket 52 against shifting, the shifting of block 94 being looked to for allowing servo action of the one shoe on the other.

A spring 96 received in a socket formed in the stem 160 acts on a beveled centering plunger 97 yieldingly seated in a V-shaped notch in the base of the block 94; this construction is more particularly useful if the bracket 52 is locked in place by tightening up the bolts 90.

The wedge 162 preferably has its faces inclined at different angles, as the two shoes do not wear equally in a brake of this type.

The arrangement of Figure 12 is the same as that in Figure 11, except that the spring 96 is dispensed with.

Figures 13 and 14 show a centering lever 98 centrally fulcrumed on the boss 54, and having inwardly and outwardly extending arms 100 and 102 engaging stops 104 and 106 carried by the backing plate. The lever has a third arm 108 extending alongside the shoe 22 and acted on by a spring 110 connected to the backing plate. A plate 155 mounted on the boss 54 serves as a cover for the opening in the backing plate through which the boss 54 passes.

While several embodiments have been described in detail, it is not my intention to limit the scope of the invention to those particular embodiments, or otherwise than by the terms of the appended claims.

I claim:

1. A shiftable anchorage type brake comprising a backing plate carrying a pair of shoes provided with a floating connection between their ends, said connection including a bracket movably mounted on the backing plate between the ends of the shoes, a pair of plungers arranged end to end in said bracket and having their outer ends engaging the ends of the shoes, and an adjuster mounted in said bracket transversely of said plungers and which is operable from outside the backing plate to force said plungers apart, in combination with centering means mounted on the backing plate and acting on said bracket.

2. A shiftable anchorage type brake comprising a backing plate carrying a pair of shoes provided with a floating connection between their ends, said connection including a bracket movably mounted on the backing plate between the ends of the shoes, a pair of plungers arranged end to end in said bracket and having their outer ends engaging the ends of the shoes, and an adjuster mounted in said bracket transversely of said plungers and which is operable from outside the backing plate to force said plungers apart, in combination with a pair of yielding centering levers mounted on the backing plate and embracing said bracket between them.

3. A shiftable anchorage type brake comprising a backing plate carrying a pair of shoes provided with a floating connection between their ends, said connection including a bracket movably mounted on the backing plate between the ends of the shoes, a pair of plungers arranged end to end in said bracket and having their outer ends engaging the ends of the shoes, and an adjuster mounted in said bracket transversely of said plungers and which is operable from outside the backing plate to force said plungers apart, in combination with a centering lever centrally fulcrumed on the bracket and having arms projecting respectively inwardly and outwardly from the bracket, stops on the backing plate and respectively in the paths of the arms of said lever in forward and reverse braking, and a spring urging said arms against said stops to center the shoes when the brake is released.

4. A brake shoe connector comprising a member disposed between adjacent shoe ends, a stationary support for said member and in which the member is movable in a direction parallel with the shoes, means for guiding said member in its movement, shafts slidably mounted in said member in axial relation and connected to the shoe ends, a cone screw carried by the member and extending through the support, a cone carried by said cone screw and cooperating with the inner ends of the shafts, an adjustable spring anchor carried by the support, and spring means carried by the spring anchor and cooperating with the member for normally returning the same to adjusted position following a braking operation.

5. A device as set forth in claim 4 wherein the cone is recessed and the inner ends of the shafts are provided with tapered portions received within the recesses of the cone.

RUDOLPH A. GOEPFRICH.